United States Patent Office 2,924,586
Patented Feb. 9, 1960

2,924,586
PROCESS FOR THE REFINING OF SYNTHETIC LINEAR POLYMERIZATES OR POLYCONDENSATES

Rudolf Lotz, Obernburg (Main), and Gerhard Wick, Erlenbach (Main), Germany, assignors to Vereinigte Glanzstoff-Fabriken A.G., Wuppertal-Elberfeld, Germany No Drawing. Application June 13, 1957
Serial No. 665,586

Claims priority, application Germany June 16, 1956

8 Claims. (Cl. 260—45.75)

This invention, in general, relates to processes for the refining of synthetic linear polymerizates or polycondensates and to filaments produced thereby. The improvements provided herein lie chiefly in better heat stability of the linear high polymers and simultaneous reduction of the electrostatic charge of the high polymers obtained in the form of threads, fibers, etc.

It is known practice to achieve heat resistance in linear high polymers by adding, during their production, small quantities of an N-amino alkyl morpholin to the starting products, so that this added compound acts as a stabilizer. In the heating of these high polymers, especially of the polyamide, the viscosity remains unchanged at the melting point. For this same purpose, it has been suggested that, in the production of linear condensation products of diamines and dicarboxylic acids, a small quantity of zinc acetate and also of copper stearate be added to these starting products. Likewise, for the stabilization of linear polycarboxylic acid amides, a small quantity of a mixture of a phosphorus compound and an alkali halide have been added to these polycondensates.

The elimination of the troublesome electrostatic charges of synthetic linear high polymers, which interfere with the processing of the threads or fibers, represents for some types of fibers a problem heretofore not solved satisfactorily. As is well known, fibers of synthetic, linear high polymers have a high electrostatic charge, which develops during their production or spinning process. It has already been proposed that the threads, etc., be subjected to a subsequent treatment with, say, solutions of low-molecular condensation products. It is, similarly, a known practice to reduce the tendency of the fibers to become electrostatically charged, by a treatment with salt solutions formed from aliphatic oxyacids and alkylol amines. Similarly, solutions have been suggested which are suitable for the treatment of synthetic staple fibers and are composed of an alkylol amine salt of a fatty acid on the one hand, and the alkylol amine salt of a dibasic aliphatic acid on the other hand. It is, further, a known practice to use triethanol amine alone or the salt of triethanol amine with sebacic acid or adipic acid as an antistatic for polyamide threads. The compounds listed here often have, however, the disadvantage that the substances used cause a yellowing of the threads and, further, that the apparatus used for the processing of the thread is more or less severely attacked. Often, another drawback of the compounds hitherto proposed lies also in the fact that they are soluble in water and do not remain in the final product—that is, they are washed away.

According to the principles of the present invention, the quality of synthetic linear polymerizates of polycondensates is improved—especially in the heat resistance of the linear high polymers and the simultaneous reduction of electrostatic charge of the threads and fibers formed from the high polymers—if there is added either to the monomeric reactants or the linear high polymers an aromatic distannan or digermanan compound of the general formula:

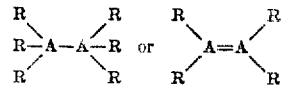

wherein A represents Sn or Ge, R represents a phenyl group, a naphthyl group, a halophenyl, lower alkyl phenyl or aralkyl phenyl group or a cyclohexyl group. The quantity of the above compounds added range from 0.05 to 2% with reference to the monomer or the high polymer. The following, among others, may be mentioned as compounds which may be used according to the invention: hexaphenyl distannan, hexacyclohexyl distannan, tetracyclohexyl distannan, hexaphenyl digermanan, hexacyclohexyl digermanan, tetracyclohexyl digermanan, hexa-p-toluyl distannan, hexanaphthyl distannan and others.

The linear high polymers to be treated with these compounds include such polymers as polyacrylonitrile, polyamides formed either of caprolactam or hexamethylene diamine adipate, or also polyethylene terephthalate. According to the invention, the above-mentioned distannan or digermanan compounds are added to the monomers, that is, to the acrylic acid nitrile, the caprolactam, the hexamethylene diamine adipate or the terephthalic acid diglycol ester, and the polymerization or polycondensation is carried out by the usual process. It is, however, also possible to incorporate the compounds with the finished polymerizates or polycondensates in a suitable manner. In any case the result is obtained that the linear high polymers acquire an improvement both in respect to heat stability and also in respect to electrostatic effect. The compounds named are also distinguished, among other things, by the fact that they are insoluble in water, and cannot, therefore, be washed away.

The electrostatic charge on the filaments or threads is measurable by determining the electrical resistance of the thread with a megohmmeter. The evaluation of the electrostatic charges for comparison purposes is based on the general principle that the electrical resistance of the filament or thread increases proportionally with increased electrostatic charge on the thread.

The invention will be further illustrated in the following specific examples.

Example I

To 226 g. of caprolactam and 6 mol percent of distilled water, there are added 3,000 mg. of ε-aminocapronic acid as catalyst and 230 mg. of hexacyclohexyl distannan, and the preparation is heated to condensing temperatures until the polycondensate becomes stringy. The polycondensate obtained is pure white and is extracted with distilled water for 6 hours. The polycondensate is now melted and spun to threads in a familiar manner. Conductivity measurements were taken on the threads with the aid of a megohmmeter. Here, the electrical resistance of the threads was $50 \times 10^9$ ohms.

As a control experiment, the same preparation of caprolactam is likewise heated to condensing temperatures, without, however, the addition of hexacyclohexyl distannan. From the polycondensates developed, threads are produced. A very high electrostatic charge is revealed by determining the electrical resistance of the threads, which is a value higher than $1,000 \times 10^9$ ohms.

Examples II 1,000 g. of a polyamide (K-value about 69) are combined with 1 g. of hexacyclohexyl digermanan and melted in an inert gas current until the added compound dissolves in it. A clear, stringy melt results, from which threads are produced by the usual method. The conductivity measurements with the megohmmeter indicate a relatively low electrostatic charge, expressed in an electrical resistance of $3.0 \times 10^9$ ohms.

As control experiment, the same preparation of polyamide, without, however, the additive of hexacyclohexyl digermanan, was melted and processed into threads. The electrostatic charge was a value of over $1,000 \times 10^9$ ohms.

*Example III*

2,000 g. of hexamethylene diamine adipate are combined with 2 g. of hexacyclohexyl distannan and condensed in an autoclave for four hours at 212° C. and about 18 atmospheres excess pressure. A temperature rise to 250° C. occurs for 2 additional hours, during which the steam pressure is slowly released. After a further three-hour heating to 270° C. under normal pressure, the preparation is completely polycondensed. The polycondensate developed is pure white and the threads produced from it show a relatively low electrostatic charge, expressed by its electrical resistance as $10 \times 10^9$ ohms.

As a control experiment, the same preparation, without, however, hexacyclohexyl distannan, was polycondensed under the same temperature and pressure conditions. The threads produced show a very high electrostatic charge, the electrical resistance being over $10,000 \times 10^9$ ohms.

*Example IV*

1,800 g. of polyacrylonitrile (K-value about 96) were suspended in 8,200 g. of dimethyl formamide with the addition of 10 g. of hexanaphthyl distannan, and the preparation was heated in the usual manner to a temperature of about 110° C. so that a clear spinning solution develops. The threads obtained from this spinning solution are stretched in the proportion 1:6. The measurement of the electrostatic charge yielded a value of $1.2 \times 10^9$ ohms.

As a control experiment, the same preparation, without, however, the additive of hexanaphthyl distannan, was processed. The measurement of the electrostatic charge of the threads was a very high value, $10,000 \times 10^9$ ohms.

*Example V*

600 g. of terephthalic acid diglycol ester are heated to polycondensing temperatures with the addition of 600 mg. of zinc oxide-boric trioxide and 60 mg. of hexa-p-toluyl distannan. A pure white polycondensate is obtained with a K-value of ca. 51. The threads obtained from this polycondensate after the melting-spinning process show a slight electrostatic charge with a measured value of the electrical resistance of $50 \times 10^9$ ohms.

As a control experiment, the same preparation was used for the preparation of the polyethylene terephthalate, but the hexa-p-toluyl distannan was not added to the preparation. The polycondensates obtained are then processed into threads by the usual melting-spinning process. The threads show an electrostatic charge measurement value of over $10,000 \times 10^9$ ohms.

*Example VI*

To 1,000 g. of polyethylene terephthalate (K-value about 52) there are added 200 mg. of hexacyclohexyl digermanan, and the polyester is melted in an inert gas current and spun to threads by the usual melting-spinning process. The electrostatic charge of the threads produced gave a relatively low value, expressed in the measured resistance of $30 \times 10^9$ ohms.

In a control experiment, the same preparation, without, however, the addition of hexacyclohexyl digermanan, was processed into threads according to the usual method. The threads show a high electrostatic charge measurement value of over $10,000 \times 10^9$ ohms.

*Example VII*

2,000 g. of a polyamide made of caprolactam are combined with 500 mg. of hexaphenyl distannan and melted in the inert gas current until the added compound dissolves in it. A clear melt results. The threads produced by the usual method reveal a low electrostatic charge, expressed in an electrical resistance of approximately $20 \times 10^9$ ohms.

*Example VIII*

1,350 g. of polyacrylonitrile (K-value about 102) were suspended in 6,150 g. of dimethyl formamide with the addition of 2 g. of hexa-(monochlorphenyl) distannan and heated in the usual manner to about 110° C., so that a spinning solution develops which is ready for use. The measurement of the electrostatic charge yielded a value of approximately $10 \times 10^9$ ohms.

The invention is hereby claimed as follows:

1. In filament form, a synthetic linear polymer which normally develops a high electrostatic charge upon production of filaments thereof, said polymer selected from the group consisting of a polyamide, polyacrylonitrile, and polyethylene terephthalate and containing a small amount, sufficient to materially reduce said electrostatic charge, of a compound selected from the group consisting of

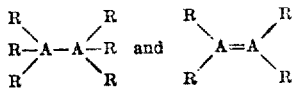

wherein A represents a member from the group consisting of Sn and Ge and R represents a member from the group consisting of phenyl, napthyl, halophenyl, lower alkyl phenyl, aralkyl phenyl, and cyclohexyl.

2. A polyacrylic nitrile filament containing 0.05–2.0% by weight of a compound selected from the group consisting of

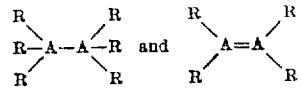

wherein A represents a member from the group consisting of Sn and Ge and R represents a member from the group consisting of phenyl, naphthyl, halophenyl, lower alkyl phenyl, aralkyl phenyl, and cyclohexyl.

3. A polyamide filament containing 0.05–2.0% by weight of a compound selected from the group consisting of

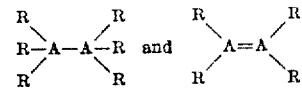

wherein A represents a member from the group consisting of Sn and Ge and R represents a member from the group consisting of phenyl, naphthyl, halophenyl, lower alkyl phenyl, aralkyl phenyl, and cyclohexyl.

4. A polyethylene terephthalate filament containing 0.05–0.2% by weight of a compound selected from the group consisting of

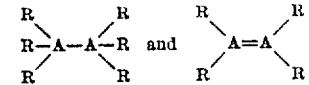

wherein A represents a member from the group consisting of Sn and Ge and R represents a member from the group consisting of phenyl, naphthyl, halophenyl, lower alkyl phenyl, aralkyl phenyl, and cyclohexyl.

5. In the production of filaments from linear polymers which develop high electrostatic charges during manufacture of filaments therefrom, the improvement comprising incorporating 0.05–2.0% by weight of a compound selected from the group consisting of

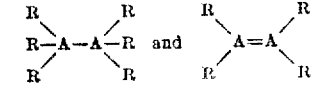

wherein A represents a member from the group consisting of Sn and Ge and R represents a member from the group consisting of phenyl, naphthyl, halophenyl, lower alkyl phenyl, aralkyl phenyl, and cyclohexyl into a linear polymer selected from the group consisting of a polyamide, polyacrylonitrile, and polyethylene terephthalate; and spinning said linear polymer into filaments thereof.

6. The process of claim 5 wherein the said compound is added to the polymer prior to polymerization thereof.

7. The process of claim 5 wherein the said compound is added to the polymer after polymerization thereof.

8. In filament form, a synthetic linear polymer selected from the group consisting of polyacrylonitrile, polyethylene terephthalate, and polyamide, which polymer normally develops a high electrostatic charge upon production of filaments thereof, said polymer containing 0.05–2.0% by weight of a compound selected from the group consisting of

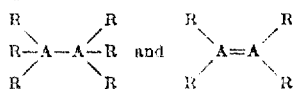

wherein A represents a member from the group consisting of Sn and Ge and R represents a member from the group consisting of phenyl, naphthyl, halophenyl, lower alkyl phenyl, aralkyl phenyl, and cyclohexyl.

References Cited in the file of this patent
UNITED STATES PATENTS

| | | |
|---|---|---|
| 2,236,910 | Lincoln et al. | Apr. 1, 1941 |
| 2,643,242 | Churchill | June 23, 1953 |
| 2,770,611 | Nitzche | Nov. 13, 1956 |

UNITED STATES PATENT OFFICE
CERTIFICATE OF CORRECTION

Patent No. 2,924,586                       February 9, 1960

Rudolf Lotz et al.

It is hereby certified that error appears in the printed specification of the above numbered patent requiring correction and that the said Letters Patent should read as corrected below.

Column 4, line 55, for "0.05-0.2%" read -- 0.05-2.0% --.

Signed and sealed this 22nd day of November 1960.

(SEAL)

Attest:

KARL H. AXLINE                              ROBERT C. WATSON
Attesting Officer                            Commissioner of Patents